US011821978B2

United States Patent
El Soussi et al.

(10) Patent No.: US 11,821,978 B2
(45) Date of Patent: Nov. 21, 2023

(54) SECURE RANGING

(71) Applicants: Katholieke Universiteit Leuven, KU LEUVEN R&D, Leuven (BE); Stichting IMEC Nederland, Eindhoven (NL)

(72) Inventors: Mohieddine El Soussi, Turnhout (BE); Jacobus Romme, Schiedam (NL); Pepijn Boer, Vught (NL); Roel Peeters, Diest (BE)

(73) Assignees: Katholieke Universiteit Leuven, Leuven (BE); Stichting IMEC Nederland, Eindhoven (NL)

( * ) Notice: Subject to any disclaimer, the term of this patent is extended or adjusted under 35 U.S.C. 154(b) by 517 days.

(21) Appl. No.: 16/794,730

(22) Filed: Feb. 19, 2020

(65) Prior Publication Data
US 2020/0264297 A1    Aug. 20, 2020

(30) Foreign Application Priority Data

Feb. 19, 2019 (EP) .................................... 19158110

(51) Int. Cl.
*G01S 13/84* (2006.01)
*G01S 13/82* (2006.01)
(Continued)

(52) U.S. Cl.
CPC ............ *G01S 13/84* (2013.01); *G01S 13/825* (2013.01); *H04W 12/0471* (2021.01); *H04W 12/069* (2021.01); *H04W 12/63* (2021.01)

(58) Field of Classification Search
CPC ...... G01S 13/84; G01S 13/825; H04W 12/63; H04W 12/0471; H04W 12/069
See application file for complete search history.

(56) References Cited

U.S. PATENT DOCUMENTS 8,325,704 B1 * 12/2012 Lemkin ................. H04J 3/0667
                                                          370/347
2011/0273334 A1   11/2011 Karr
(Continued)

OTHER PUBLICATIONS

Olafsdottir et al, "On the security of carrier phase-based ranging", In Internation Conference on Cryptographic Hardware and Embedded Systems, pp. 490-509, Springer, Cham, 2017 (Year: 2017).*
(Continued)

*Primary Examiner* — Kevin Bechtel
*Assistant Examiner* — Forrest L Carey
(74) *Attorney, Agent, or Firm* — McDonnell Boehnen Hulbert & Berghoff LLP

(57) ABSTRACT

A method of secure wireless ranging between a verifier node and a prover node comprises performing a measurement procedure resulting in a two-way phase measurement and a round-trip time measurement between the verifier node and the prover node. The measurement procedure comprises the verifier node transmitting on the frequency a verifier packet, the prover node receiving the verifier packet and performing a phase measurement of a verifier carrier signal and a time-of-arrival measurement of a verifier frame delimiter, the prover node transmitting a prover packet, and the verifier node receiving the prover packet and performing a phase measurement of the prover carrier signal and a time-of-arrival measurement of the prover frame delimiter. The method further comprises calculating a distance between the verifier node and the prover node based on the two-way phase measurements and the round-trip time measurements for the plurality of frequencies.

15 Claims, 7 Drawing Sheets

(51) Int. Cl.
*H04W 12/069* (2021.01)
*H04W 12/0471* (2021.01)
*H04W 12/63* (2021.01)

(56) References Cited

U.S. PATENT DOCUMENTS

| | | | | |
|---|---|---|---|---|
| 2012/0307810 | A1* | 12/2012 | Sinsuan | H04W 72/0446 370/336 |
| 2014/0137210 | A1* | 5/2014 | Kountouris | H04W 12/126 726/4 |
| 2015/0256335 | A1* | 9/2015 | Lin | H04W 12/033 380/255 |
| 2020/0212943 | A1* | 7/2020 | Banin | H04B 1/04 |
| 2021/0383000 | A1* | 12/2021 | Huapaya | G06F 21/54 |

OTHER PUBLICATIONS

Olafsdóttir, Hildur, Aanjhan Ranganathan, and Srdjan Capkun. "On the security of carrier phase-based ranging." In International Conference on Cryptographic Hardware and Embedded Systems, pp. 490-509. Springer, Cham, 2017.

Imec, Embracing a Better Life. "Accurate & Secure Distance Measurement with Bluetooth." 2 pages.

Atmel, "Low Power, 2.4GHz Transceiver for ZigBee, RF4CE, IEEE 802.15.4, 6LoWPAN, and ISM Applications," Preliminary Data Sheet. Atmel-8351E-MCU_Wireless-AT86RF233_Datasheet_072014, dated 2014, 225 pages.

Seok, Yongho et al. "Secure SU and MU Ranging Measurement Procedure," IEEE 802.11-18/0229r1, dated Jan. 18, 2018, 22 pages.

Search Report, European Patent Application No. 19158110.7, dated Aug. 8, 2019, 10 pages.

Lanzisera, Steven, David Zats, and Kristofer SJ Pister. "Radio frequency time-of-flight distance measurement for low-cost wireless sensor localization." IEEE Sensors Journal 11, No. 3 (2011): 837-845.

Rapinski, Jacek, and Michal Smieja. "ZigBee ranging using phase shift measurements." The Journal of Navigation 68, No. 4 (2015): 665-677.

Kluge, Wolfram, and Dietmar Eggert. "Project: IEEE P802. 15 Working Group for Wireless Personal Area Networks (WPANs)." dated Nov. 2009, 21 pages.

Rasmussen, Kasper Bonne, and Srdjan Capkun. "Realization of RF Distance Bounding." In USENIX Security Symposium, pp. 389-402. 2010.

* cited by examiner

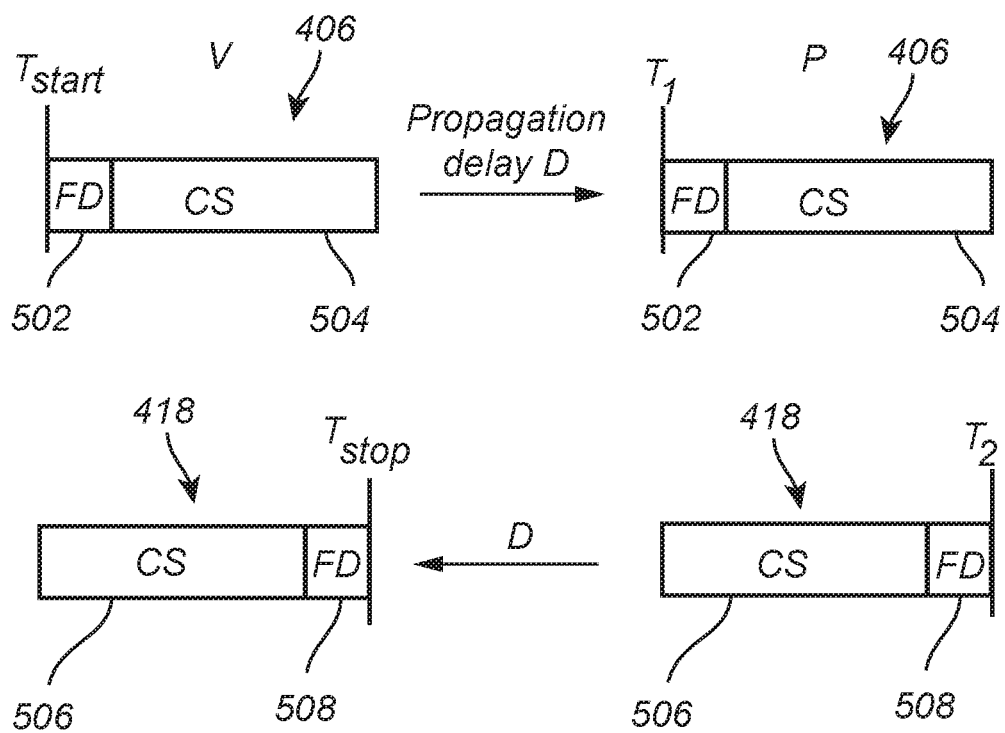
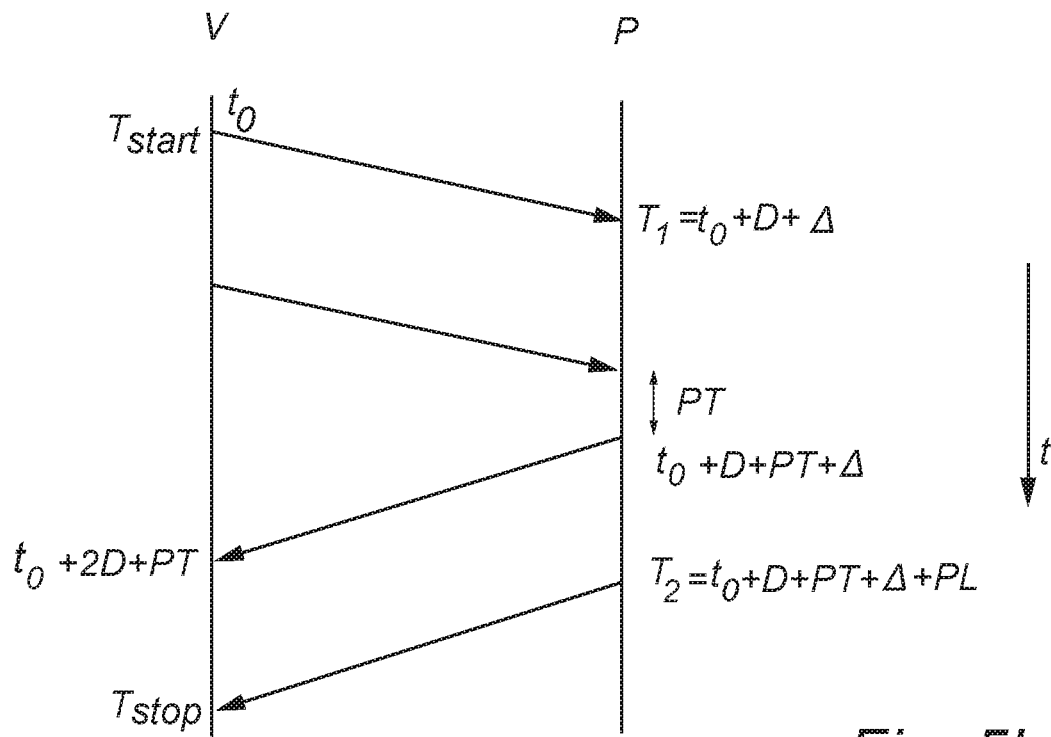
Fig. 5a
Fig. 5b

SECURE RANGING

CROSS-REFERENCE TO RELATED APPLICATIONS

The present application is a non-provisional patent application claiming priority to European Patent Application No. EP19158110.7, filed Feb. 19, 2019, the contents of which are hereby incorporated by reference.

FIELD OF THE DISCLOSURE

Ranging involves determining the distance between wireless nodes.

Multi-carrier Phase Difference Ranging (MCPDR) is a method used to evaluate the range between two wireless nodes based on phase difference of two or more carrier signals. It may be implemented in narrow-band systems like Bluetooth, Bluetooth Low Energy (BLE), Zigbee, and others. An example implementation of such a method is disclosed in W. Kluge and D. Eggert, "Ranging with IEEE 802.15.4 narrowband PHY", September 2009, https://mentor.ieee.org/802.15/dcn/09/15-09-0613-01-004franging-with-ieee-802-15-4-narrow-band-phy.ppt.

Ranging may be performed in applications where proximity between nodes controls access or activation of some resource, such as opening a door lock; accessing a car, safe, or device; locating Internet-of-Things (IoT) devices, etc.

There is always the risk of an adversary attempting to interfere with the ranging procedure.

BACKGROUND

Ranging involves determining the distance between wireless nodes.

Multi-carrier Phase Difference Ranging (MCPDR) is a method used to evaluate the range between two wireless nodes based on phase difference of two or more carrier signals. It may be implemented in narrow-band systems like Bluetooth, Bluetooth Low Energy (BLE), Zigbee, and others. An example implementation of such a method is disclosed in W. Kluge and D. Eggert, "Ranging with IEEE 802.15.4 narrowband PHY", September 2009, https://mentor.ieee.org/802.15/dcn/09/15-09-0613-01-004franging-with-ieee-802-15-4-narrow-band-phy.ppt.

Ranging may be performed in applications where proximity between nodes controls access or activation of some resource, such as opening a door lock; accessing a car, safe, or device; locating Internet-of-Things (IoT) devices, etc.

There is always the risk of an adversary attempting to interfere with the ranging procedure.

SUMMARY

An embodiment of the present disclosure provides a method of wireless ranging that is more secure against attacks from illegitimate devices.

According to a first aspect, there is provided a method of secure wireless ranging between a verifier node and a prover node, comprising, for each frequency in a plurality of frequencies, performing a measurement procedure resulting in a two-way phase measurement and a round-trip time measurement between the verifier node and the prover node, the measurement procedure comprising the verifier node transmitting on the frequency a verifier packet comprising a verifier carrier signal and a verifier frame delimiter, the prover node receiving the verifier packet and performing a phase measurement of the verifier carrier signal and a time-of-arrival measurement of the verifier frame delimiter, the prover node transmitting on the frequency a prover packet comprising a prover carrier signal and a prover frame delimiter, and the verifier node receiving the prover packet and performing a phase measurement of the prover carrier signal and a time-of-arrival measurement of the prover frame delimiter, wherein each of the verifier frame delimiter and the prover frame delimiter comprises a respective authentication code, wherein the authentication code is based on key a commonly known by the verifier node and the prover node, the method further comprising calculating a distance between the verifier node and the prover node based on the two-way phase measurements and the round-trip time measurements for the plurality of frequencies, wherein the carrier signal is authenticated based on each corresponding the authentication code of the corresponding the frame delimiter and the commonly known key.

With "frame delimiter" should be understood a modulated bit sequence comprised in the transmitted packet.

With "carrier signal" should be understood a continuous-wave sinusoidal oscillation with a single frequency-component (neglecting harmonics and other imperfections). Such a signal may typically originate directly from the local oscillator (LO) of the transmitting node. However, as an example, it can also be obtained by applying a constant modulation, such as a frequency shift keying (FSK) modulation with a constant input (all 1s or 0s).

In a general case, "prover node" and "verifier node" should be understood as mere labels for, respectively, a first and a second node between which secure ranging is performed. However, as a specific example, the verifier node may control access to a resource and the prover node may be used to gain access to the resource controlled by the verifier node, by virtue, at least in part, of physical proximity between the prover node and the verifier node.

With MCPDR, there is a phase ambiguity bound (i.e., a maximum measurable distance above which the phase will wrap and roll over). This maximum measurable distance with MCPDR depends on the maximum measurable phase difference between two adjacent frequencies and the frequency step size. Thus, for example, for a 1 MHz frequency step size the maximum distance or the ambiguity bound is 150 m, after which the measured distance rolls over to 0 m. Similarly, for frequency step sizes of 0.5, 2, 4 MHz, the respective maximum measurable distances are 300, 75 and 37.5 m, beyond which there is a rollover of the measured distance.

One or more adversaries situated between the verifier and the prover can use the phase/distance rollover to manipulate the phase of the signals and hence the distance estimation in such a way that the resulted distance is decreased to his favor. Such an attack is called a relay attack, which is a form of man-in-the middle attack. The relay attack can be performed in several ways (e.g., phase-slope rollover attack, RF cycle slip attack and on-the-fly phase manipulation attack). Thus, MCPDR can falsely estimate the distance if the signals were manipulated by an adversary.

This situation may be prevented, or at least mitigated, by performing both a two-way phase measurement and a round-trip time measurement, the latter corresponding to a Time of Flight (ToF) or Round Trip Time (RTT) measurement. As long as the round-trip time measurement is done with an accuracy less than the ambiguity bound of the MCPDR algorithm, this allows detection of roll-over of the phase or time needed by the adversary to manipulate the phase of the signals. Hence, by measuring the round-trip time, the verifier node and/or the prover node can roughly learn about the fly time/distance of the signals and then compare it with the accurate phase-based range value.

Further, with each respective frame delimiters comprising an authentication code based on a key commonly known by the verifier node and the prover node, each receiving node may, based on the respective frame delimiter, verify the authenticity of the received packet used for phase and timing measurements. This allows the verifier node and the prover node to implement a challenge-response mechanism where the verifier transmits a challenge in the form of the authentication code comprised in the verifier packet in addition to the verifier carrier signal, and the prover transmits back a response in the form of the authentication code comprised in the prover packet in addition to the prover carrier signal. This process is carried out for each frequency of the plurality of frequencies. Thus, in addition to measuring the round-trip time, the verifier can use the prover frame delimiter to ensure that the received package comes from the prover and vice versa.

Using the frame delimiter not only for authentication, but also for the time of arrival measurements, makes for an efficient system, since less space in the packet is used. Since the resulting transmissions are shorter, energy is saved.

In other words, the carrier signal is used to calculate the phase and hence the distance, and the frame delimiter is used both to secure the carrier (i.e., to verify that the signal is coming from the right node) and to calculate the round trip time to verify that the signal was not relayed or delayed.

This allows one to securely perform range measurement or localization while solving, or at least mitigating, the problem of a relay attack.

According to an embodiment, before carrying out the measurement procedure for each frequency of the plurality of frequencies, the prover node and the verifier node may wirelessly and securely exchange the commonly known key, which typically is a symmetric key. Alternatively, the same key may be calculated by each of the nodes using commonly known information.

According to an embodiment, the phase measurements may for example be performed by collecting real (I) and imaginary (Q) samples from the received carrier.

According to an embodiment, each verifier carrier signal is preceded by the frame delimiter and each prover carrier signal is followed by the frame delimiter. This allows the verifier packet to be ended with the verifier carrier signal and the prover packet to be started with the prover carrier signal. Thus, no modulated symbols, which could have affected the phase-locked loop (PLL) of the local oscillator (LO) of the prover node, are transmitted by the prover node between its phase measurement of the verifier carrier signal and its transmission of the prover carrier signal. This allows for a more accurate and reliable two-way phase-measurement.

According to an embodiment, the authentication code is a sequence of bits selected using a pseudo-random function, for example from a pre-determined set of sequences. This allows for a fast, low-complexity implementation that still is secure.

According to an embodiment, the pseudo-random function has as input the commonly known key and one or more of the following: an index of the carrier signal, a sequence index, an identifier of the node transmitting the corresponding the frame delimiter, and an identifier of the node receiving the corresponding the frame delimiter. This allows for diversity and non-repeatability of the input to the pseudo-random function, increasing security.

According to an embodiment, the method further comprises the prover node transmitting the time-of-arrival measurement of the verifier frame delimiter and/or the phase measurement of the verifier carrier signal to the verifier node. Typically, this is done securely using the same commonly known key as used for the authentication codes. This allows the verifier node to perform the calculation of the distance between the verifier node and the prover node.

According to an embodiment, during the verifier node transmitting the verifier carrier signal, the prover node adjusts its local oscillator, LO, based on the phase measurement of the verifier carrier signal.

This will result in that both the phase and frequency of the carrier signal transmitted by the prover node will be equal to that of the received carrier signal from the initiator node at the point of reception. Thus propagating the result of the phase measurement at the prover node back to the verifier node may not be needed. Rather, since the phase of the carrier signal received at the prover node will be identical to the phase of the carrier signal transmitted by the verifier node, the phase measurement performed back at the verifier node will directly reflect the round-trip phase advance between the verifier node and the prover node.

According to an embodiment, the calculating of the distance comprises from the round-trip phase measurements and round-trip time measurements of the measurement procedure for the plurality of frequencies, excluding from further calculation measurements for frequencies wherein at least one of the prover carrier signal and the verifier carrier signal was not authenticated based on the respective frame delimiter; failing the calculating if the number of remaining frequencies after the excluding does not exceed a pre-determined threshold number; evaluating an average round-trip time based on the round-trip time measurements for frequencies remaining after the excluding; failing the calculating if the average round-trip time exceeds a pre-determined value; and, thereafter, calculating the distance based on the phase measurement results remaining after the excluding.

This provides a fast, yet secure way of evaluating the distance.

According to an embodiment, the calculating of the distance comprises, from the two-way phase measurements and round-trip time measurements of the measurement procedure for the plurality of frequencies, excluding from further calculation measurements for frequencies wherein at least one prover carrier signal and verifier carrier signal was not authenticated based on the respective frame delimiter or wherein the measured round-trip time exceeds a pre-determined value; failing the calculating if the number of remaining frequencies after the excluding does not exceed a pre-determined threshold number; assigning the remaining frequencies into a prover group and an adversary group based on their respective measured round-trip times; failing the calculating if the number of frequencies in the prover group does not exceed the threshold number or if the number of frequencies in the adversary group does exceed the threshold number; thereafter, calculating the distance based on the phase measurement results in the prover group.

This allows for improved suppression of measurements originating from transmissions by an adversary.

According to an embodiment, the prover node transmits the frame delimiter comprising a first authentication code on a condition that the verifier node carrier signal has been authenticated based on the corresponding authentication code of the corresponding verifier node frame delimiter and a second, different, authentication code otherwise. This allows the prover node to signal to the verifier node whether the verifier node packet was correctly authenticated without giving information regarding this away to an adversary.

According to an embodiment, each sequence of the predetermined set of sequences is a Gold code sequence.

Gold codes have several suitable properties for the present application. In particular, they have well-behaved autocorrelation functions which can help in improving the signal-to-noise ratio (SNR) at the receiver and thus may provide a time estimation. Also, it helps to detect if the sequence is the correct one or not and hence if it is from the right node. Further, Gold codes have bounded small cross-correlations within a set which can help in detecting false nodes or an adversary. They are easy to generate thus suitable for low cost nodes. They have characteristics resembling random noise. Further, multiple unique Gold code sequences may be generated, so that each carrier signal has a different Gold sequence, making it harder for an adversary to predict the right sequence. Finally, the total number of ones exceeds the total number of zeros by one. This allows the phase of the PLL to be relatively kept constant, which is an important constraint for measuring the phase of the received signals. In all, secure, yet efficient authentication is provided.

According to a second aspect, there is provided a method of secure wireless ranging between a verifier node and a prover node, comprising for each frequency in a plurality of frequencies, performing a measurement procedure comprising the prover node receiving a verifier packet comprising a verifier carrier signal and a verifier frame delimiter from the verifier node and performing a phase measurement of the verifier carrier signal and a time-of-arrival measurement of the verifier frame delimiter; and the prover node transmitting on the frequency a prover packet comprising a prover carrier signal and a prover frame delimiter, wherein each verifier frame delimiter and each prover frame delimiter comprises respective authentication code, wherein the authentication code is based on key a commonly known by the verifier node and the prover node, and each verifier carrier signal is authenticated by the prover node based on each corresponding authentication code of the corresponding frame delimiter and the commonly known key.

According to an embodiment, prover node may be used to gain access to a resource controlled by the verifier node by virtue, at least in part, of physical proximity between the prover node and the verifier node.

Effects and features of this second aspect are largely analogous to those described above in connection with the first aspect. Embodiments mentioned in relation to the first aspect are largely compatible with this second aspect.

According to a third aspect, there is provided a prover node configured to participate in secure wireless ranging with a verifier node, the prover node being configured to, for each frequency in a plurality of frequencies, participate in a measurement procedure comprising the prover node receiving a verifier packet comprising a verifier carrier signal and a verifier frame delimiter from the verifier node and performing a phase measurement of the verifier carrier signal and a time-of-arrival measurement of the verifier frame delimiter; and the prover node transmitting on the frequency a prover packet comprising a prover carrier signal and a prover frame delimiter, herein each verifier frame delimiter and each prover frame delimiter comprises a respective authentication code, wherein the authentication code is based on key a commonly known by the verifier node and the prover node, and each verifier carrier signal is authenticated by the prover node based on each corresponding authentication code of the corresponding the frame delimiter and the commonly known key.

According to an embodiment, prover node may be configured to gain access to a resource controlled by the verifier node by virtue, at least in part, of physical proximity between the prover node and the verifier node.

Effects and features of this third aspect are largely analogous to those described above in connection with the first aspect. Embodiments mentioned in relation to the first aspect are largely compatible with this third aspect.

According to a fourth aspect, there is provided a method of secure wireless ranging between a verifier node and a prover node, comprising for each frequency in a plurality of frequencies, performing a measurement procedure comprising the verifier node transmitting on the frequency a verifier packet comprising a verifier carrier signal and a verifier frame delimiter, the verifier node receiving a prover packet comprising a prover carrier signal and a prover frame delimiter from the prover node and performing a phase measurement of the prover carrier signal and a time-of-arrival measurement of the prover frame delimiter, wherein each verifier frame delimiter and each prover frame delimiter comprises a respective authentication code, wherein the authentication code is based on a key commonly known by the verifier node and the prover node, and each prover carrier signal is authenticated by the verifier node based on each corresponding authentication code of the corresponding frame delimiter and the commonly known key.

According to an embodiment, the verifier node may control access to a resource and provide access, by virtue, at least in part, of physical proximity between the prover node and the verifier node.

According to an embodiment, the verifier node may calculate a distance between the verifier node and the prover node based on a two-way phase measurement and a round-trip time measurement between the verifier node and the prover node for the plurality of frequencies.

Effects and features of this fourth aspect are largely analogous to those described above in connection with the first aspect. Embodiments mentioned in relation to the first aspect are largely compatible with this fourth aspect.

According to a fifth aspect, there is provided a verifier node configured to participate in secure wireless ranging with a prover node, the verifier node being configured to, for each frequency in a plurality of frequencies, participate in a measurement procedure comprising, the verifier node transmitting on the frequency a verifier packet comprising a verifier carrier signal and a verifier frame delimiter, the verifier node receiving a prover packet comprising a prover carrier signal and a prover frame delimiter from the prover node and performing a phase measurement of the prover carrier signal and a time-of-arrival measurement of the prover frame delimiter, wherein each verifier frame delimiter and each prover frame delimiter comprises a respective authentication code, wherein the authentication code is based on key a commonly known by the verifier node and the prover node and each prover carrier signal is authenticated by the verifier node based on each corresponding authentication code of the corresponding the frame delimiter and the commonly known key.

According to an embodiment, the verifier node may be configured to control access to a resource and provide access, by virtue, at least in part, of physical proximity between the prover node and the verifier node.

According to an embodiment, the verifier node may be configured to calculate a distance between the verifier node and the prover node based on a two-way phase measurement and a round-trip time measurement between the verifier node and the prover node for the plurality of frequencies.

Effects and features of this fifth aspect are largely analogous to those described above in connection with the first aspect. Embodiments mentioned in relation to the first aspect are compatible with this fifth aspect.

According to a sixth aspect, there is provided a system, comprising the prover node of the third aspect and the verifier node of the fifth aspect.

Effects and features of this sixth aspect are largely analogous to those described above in connection with the first aspect. Embodiments mentioned in relation to the first aspect are largely compatible with this sixth aspect.

BRIEF DESCRIPTION OF THE FIGURES

The above, as well as additional, features will be better understood through the following illustrative and non-limiting detailed description of example embodiments, with reference to the appended drawings.

FIG. 5a is diagram showing transmission of packets each comprising a frame delimiter and a carrier signal, according to an example embodiment.

FIG. 5b shows a timeline of transmissions, according to an example embodiment.

All the figures are schematic, not necessarily to scale, and generally only show parts which are necessary to elucidate example embodiments, wherein other parts may be omitted or merely suggested.

DETAILED DESCRIPTION

Example embodiments will now be described more fully hereinafter with reference to the accompanying drawings. That which is encompassed by the claims may, however, be embodied in many different forms and should not be construed as limited to the embodiments set forth herein; rather, these embodiments are provided by way of example. Furthermore, like numbers refer to the same or similar elements or components throughout.

Figure 1:
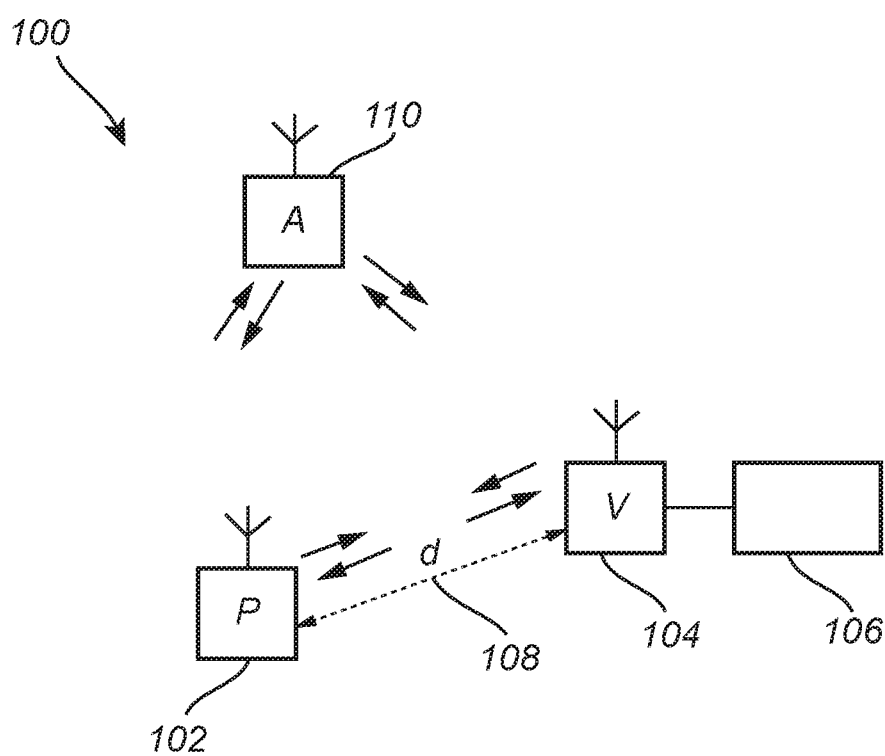
FIG. 1 shows schematically a wireless network, according to an example embodiment.

FIG. 1 shows schematically a wireless network 100. The wireless network 100 comprises a prover node "P" 102 and a verifier node "V" 104, separated by a distance d 108. The verifier node may control a resource 106 to which the prover node 102 wishes to gain access by virtue, at least in part, of proximity to the verifier node 104. As part of gaining such access, the verifier node 104 may wish to verify the distance d 108 between the prover node 102 and the verifier node 104, for example, to ensure that the prover node 102 is located in the vicinity of the verifier node 104.

An adversary node "A" 110 may spy on the transmissions of the prover node 102 and the verifier node 104 and may through illicit transmissions interfere with ranging between the prover node 102 and the verifier node 104 and/or try to gain access to the resource 106.

Figure 2:
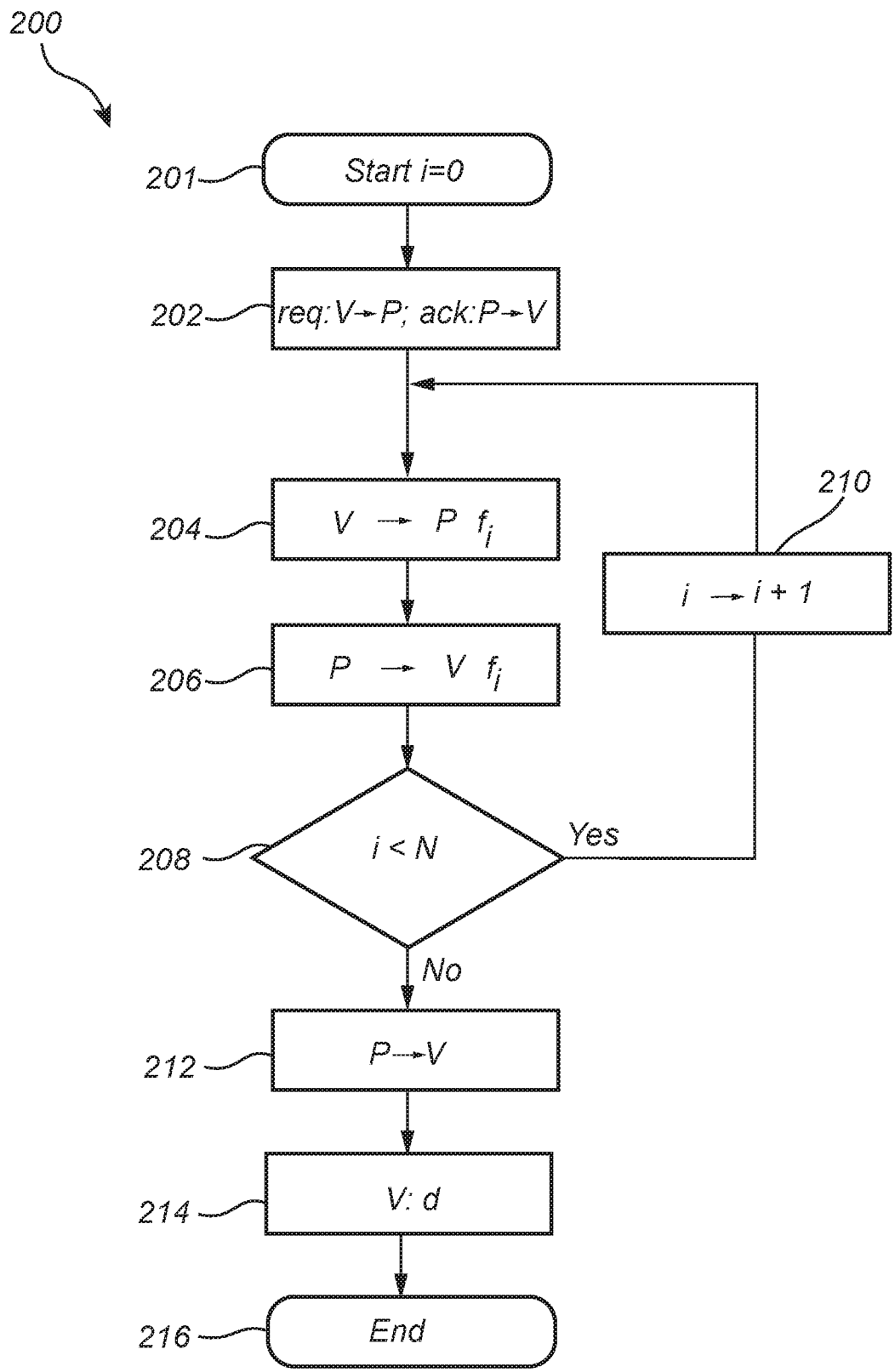
FIG. 2 is a flowchart of a method example of secure ranging, according to an example embodiment.

FIG. 2 is a flowchart of a method example 200 of secure ranging which may be implemented in the wireless network 100 (FIG. 1).

Starting, at 201, a frequency index i may be set to zero.

At 202, the verifier node 104 may transmit a ranging request and the prover node may receive the ranging request and reply by transmitting a ranging acknowledgement. Further, the verifier node may generate or exchange with the prover node a commonly known key. This may be performed securely using methods known per se. For instance, the SIGMA protocol may be used to authenticate and securely exchange the key. Further, a time synchronization may be performed between the clock of the verifier node 104 and the clock of the prover node 102.

Now, for each frequency $f_i$ in a plurality of frequencies $f_0$, $f_1$, $f_2$ ... $f_{N-1}$, a measurement procedure 204-210 is performed, resulting in a two-way phase measurement and a round-trip time measurement between the verifier node 104 and the prover node 102, as will be detailed in the following.

In some embodiments, a two-way phase measurement (i.e., a measurement of the round-trip phase advance between a first node and a second node), such as the verifier node and the prover node, may be performed based on a combination of a phase measurement performed at the second node with the first node transmitting and a phase measurement at the first node with the second node transmitting. With the phase measurement at the second node made with respect to the second node's LO, which is also used for generating the carrier signal transmitted by the second node, and the phase measurement done at the first node made with respect to the first node's LO, which is used for generating the carrier signal transmitted by the first node any phase offset between the respective local oscillators of the two nodes will cancel out when combining the two measurements.

At 204, the verifier node 104 transmits on frequency $f_i$ a verifier packet comprising a verifier frame delimiter and a verifier carrier signal. The verifier packet is received by the prover node 102. The prover node 102 performs a phase measurement of the verifier carrier signal and a time-of arrival measurement of the verifier frame delimiter. The prover node measures the phase of the verifier carrier signal with respect to the local oscillator (LO) of the prover node. Alternatively, the prover node may lock its local oscillator, LO, signal to the verifier carrier signal. Thus, it adjusts its LO based on the phase measurement of the verifier carrier signal.

At 206, the prover node 102 transmits on frequency $f_i$ a prover packet comprising a prover frame delimiter and a prover carrier signal. The prover packet is received by the verifier node 104. The verifier node 104 performs a phase measurement of the prover carrier signal and a time-of arrival measurement of the prover frame delimiter.

At 208, if the measurement procedure is to be performed on further frequencies out of the total of N frequencies, at 210, the verifier node 104 and the prover node 102 may switch to the next frequency $f_{i+1}$ and repeat the measurement procedure 204, 206. Thus, the measurement procedure is repeated several times at different frequencies.

At 212, the prover node 102 may encrypt its measurement results, including the time-of arrival measurements for each frequency $f_i$, and, optionally, if the prover node did not lock its LO to the verifier signal at 204, the phase measurements, with the commonly known key and transmit them. This transmission is received by the verifier node 104.

At 214, the verifier node 104 may calculate the distance d between the verifier node 104 and the prover node 102 based on the measurements results, which involve the two-way phase measurements and the round-trip time measurements for the plurality of frequencies $f_i$. Some of the measurements may be excluded due to their being biased or modified by an adversary. Frequencies for which measurements may be used may be chosen based on the round-trip-time measurements and the authentication based on the authentication codes. In conjunction with FIGS. 6 and 7 below, two alternative algorithms are described.

If the calculated distance d is smaller than a pre-determined value, the verifier node 104 may provide access to the resource 106.

At 216, the method example finishes.

Each verifier frame delimiter and each prover frame delimiter above comprises an authentication code. The authentication code is based on a key commonly known by the verifier node and the prover node, which may be the key generated or exchanged between the nodes at 202.

At 204 above, the prover node 102 may correlate the bit sequence of the received authentication code of the verifier frame delimiter with an available known sequence based on the commonly known key. If the outcome of this comparison is an impulse-like signal with an amplitude higher than a pre-determined threshold, then the verifier packet, including the frame delimiter and the carrier signal, is authenticated by the prover node as coming from the verifier node, since this with high probability indicates that the signal has been sent by the verifier node. Otherwise, the signal is not authenticated, and is deemed as having been sent by another node (e.g., an adversary or the signal was corrupted), for example due to interference.

Similarly, at 206 above, the verifier node 104 may correlate the bit sequence of the received authentication code of the prover frame delimiter with the available known sequence based on the commonly known key. If the outcome of this comparison is an impulse-like signal with an amplitude higher than a pre-determined threshold, then the prover packet, including the frame delimiter and the carrier signal, is authenticated as coming from the prover node, since this indicates that the signal has been sent by the prover node with high probability. Otherwise, the signal is not authenticated, and is deemed as having been sent by another node (e.g., an adversary or the signal was corrupted), for example due to interference.

The prover node 102 then generates a correct response sequence if the received sequence was correct and an incorrect response sequence, to inform the verifier node 104 that the received signal is illegitimate, if the received sequence was incorrect. In other words, the prover node 102 transmits the frame delimiter comprising a first authentication code on a condition that the verifier node carrier signal has been authenticated based on the corresponding authentication code of the corresponding verifier node frame delimiter and a second, different, authentication code otherwise.

The authentication code may be a sequence of bits selected randomly, for example, using a pseudo-random function, and in some examples from a pre-determined set of sequences.

The pseudo-random function may as input have commonly known key and one or more of the following: an index of the carrier signal, a sequence index, an identifier of the node transmitting the corresponding the frame delimiter, and an identifier of the node receiving the corresponding the frame delimiter. The pseudo-random function may output the authentication code, or in the case of using a pre-determined set of sequences, an index indicating a specific sequence from the pre-determined set of sequences.

Each sequence of the pre-determined set of sequences may be a Gold code sequence. Gold codes are constructed by combining two maximal length sequences of the same length with each other, and the maximal length sequences can be generated using linear-feedback shift register (LFSR). For a Gold sequence of length $2^n-1$, one uses two LFSRs, each contains n registers and the set of Gold code sequences consists of $2^n+1$ unique sequences.

Figure 3:
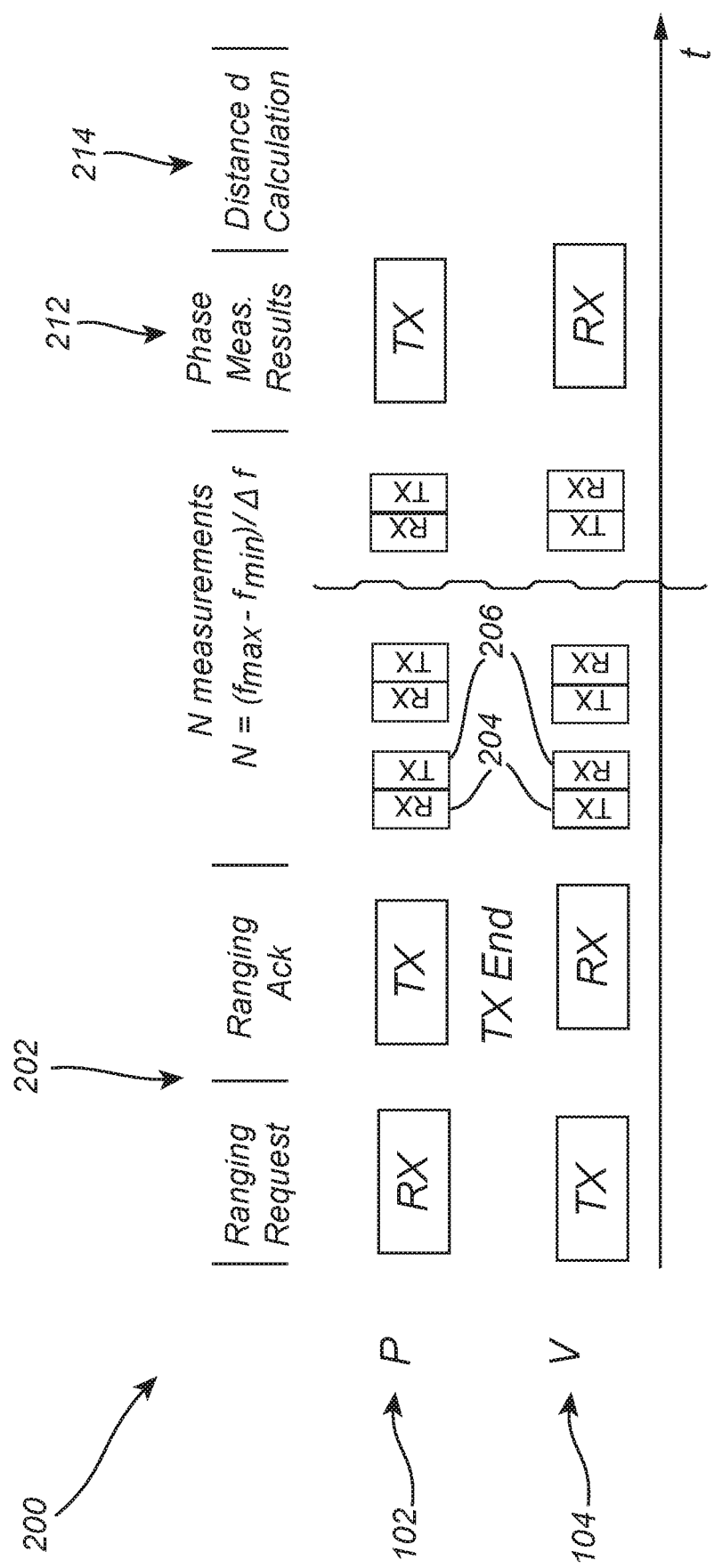
FIG. 3 is a timing diagram of transmissions, according to an example embodiment.

FIG. 3 is a timing diagram of transmissions by the prover node "P" 102 and the verifier node "V" 104 during the method example 200 (FIG. 2). Transmissions by each respective node are marked "TX" and reception by "RX".

Shown, at 202, are the ranging request transmission by the verifier node 104 received by the prover node 102 and the ranging acknowledgement transmission by the prover node 102 received by the verifier node 104.

Further shown, at 204, are the respective transmissions, at each frequency $f_i$, of the packet comprising the frame delimiter and the carrier signal from the verifier node 104, received by the prover node 102, and, at 206, the packet comprising the frame delimiter and the carrier signal from the prover node 102, received by the verifier node 104.

Further shown, at 212 (FIG. 2), is the transmission by the prover node 102 of the measurement results, received by the verifier node 104.

Finally shown, at 214 (FIG. 2), is timing of the distance calculation performed by the verifier node.

Figure 4:
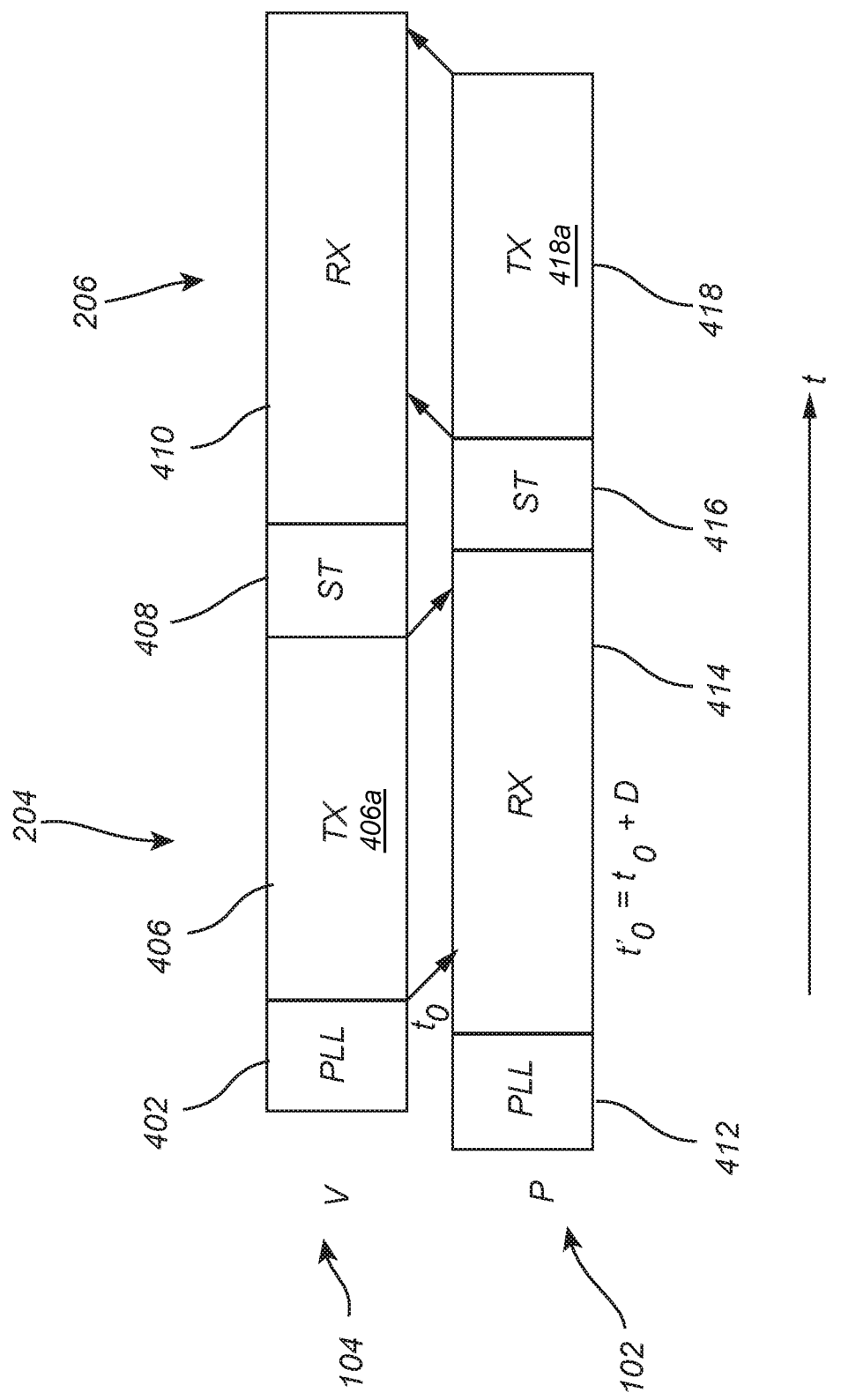
FIG. 4 is a detailed timing diagram of transmissions, according to an example embodiment.

FIG. 4 is a detailed timing diagram of transmission and reception at 204 and 206 by the verifier node "V" 104 and the prover node "P" 102, with half-duplex operation and transmission/reception at each node.

At 402 and 412, the respective phase-locked loops (PLLs) of the verifier node 104 and of the prover node 102 settle.

At 406, corresponding to 204 in FIG. 2 above, the verifier node 104 transmits the verifier packet, which is received, at 414, by the prover node 102.

At 410, corresponding to 206 in FIG. 2 above, the prover node 102 transmits 418 the prover packet 418a, which is received, at 410, by the verifier node 104.

When the verifier node 104 transmits its signal at instant $t_0$, the prover node 102 will receive it at instant $t'_0$ where $t'_0 = t_0 + D$, where D is the propagation delay between the two nodes, and vice versa.

The transmitting 406 and the receiving 410 by the verifier node 104 is separated by a switching time "ST" 408. Similarly, the receiving 414 and transmitting 418 by the prover node 102 is separated by a switching time 416.

FIG. 5a is diagram showing transmission of packets each comprising a frame delimiter and a carrier signal.

Starting at time $T_{start} = t_0$, the verifier node ("V") 104 (FIGS. 1-3) transmits the verifier packet 406a (FIG. 4) comprising the verifier frame delimiter 502 followed by the verifier carrier signal 504. Being subject to propagation delay, D, the verifier packet 406a comprising the verifier frame delimiter 502 followed by the verifier carrier signal 504 is received at the prover node at a later measured time $T_1$.

Similarly, the prover node ("P") 102 (FIGS. 1-3) transmits the prover packet 418a (FIG. 4) comprising the prover carrier signal 506 followed by the prover frame delimiter 508, ending at a time $T_2$. Again being subject to propagation delay D, the prover packet 418a (FIG. 4) comprising the prover carrier signal 506 followed by the prover frame delimiter 508 is received at the verifier node ending at a later measured time $T_{stop}$.

FIG. 5b shows a timeline of transmissions. The verifier node 104 (cf FIGS. 1-3) transmits the verifier packet, as in FIG. 5a, starting at a time $T_{start}=t_0$. The prover node 102 measures the time instant $T_1$ at which the verifier frame delimiter 502 (FIG. 5a) has been received (i.e., the time of arrival of the verifier frame delimiter 502, with respect to the clock of the prover node 102). This measured time $T_1$ equals the starting time $T_{start}=t_0$ plus the propagation delay D, plus a clock error Δ, by which the clock of the prover node differs from the clock of the verifier node. Then, the prover node 102 after some processing time PT measures the time instant $T_2$ at which the frame delimiter, that contains the response bits, is transmitted.

The verifier node 104 measures the time instant $T_{stop}$ at which the prover frame delimiter has been received (i.e., the time of arrival of the prover frame delimiter 508, with respect to the clock of the verifier node 104).

The time instants $T_1$ and $T_2$ are later, at 212 above, encrypted using the symmetric key and transmitted to the verifier.

The verifier may then, at 214 above, evaluate the round trip time by taking the difference between $T_{stop}$ and $T_{start}$ and from that subtract the difference between $T_2$ and $T_1$, which corresponds to the processing time PT at the prover node 102 and the packet length duration PL. This is performed separately for each frequency.

The presence of an interfering adversary located further away from the prover node would lead to further propagation delays, which would result in a shift in the measured round-trip time.

Figure 6:
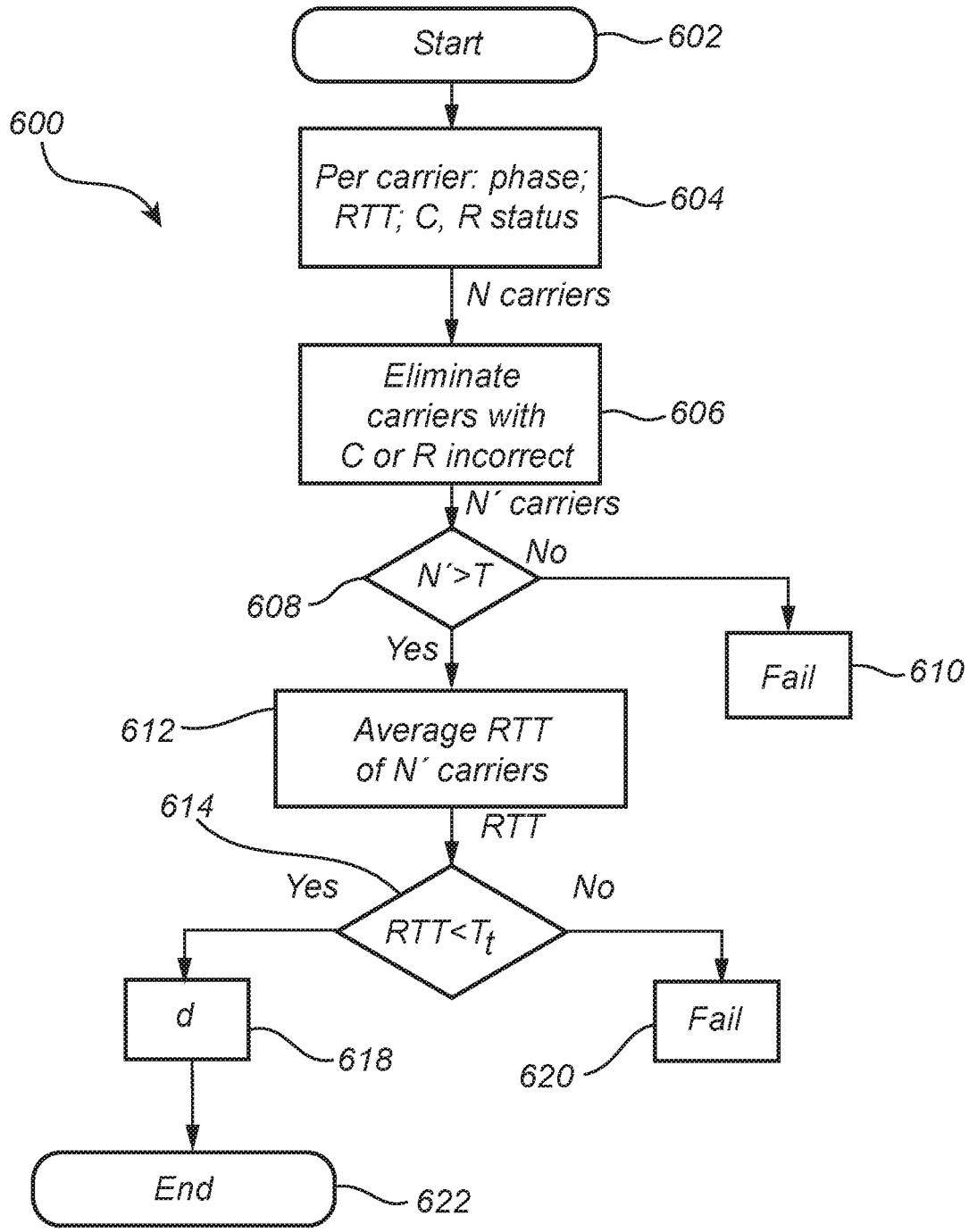
FIG. 6 shows a flow chart of a first algorithm for distance determination, according to an example embodiment.

FIG. 6 shows a flow chart of a first algorithm for distance determination which may be performed at 214 (FIG. 2).

At 602, the algorithm starts.

At 604, the algorithm 600 receives as input two-way phase measurements per frequency $f_i$, round-trip-time RTT measurements per frequency, and the results of the authentication per frequency. The results of the authentication comprise a challenge status C of the authentication of the verifier packet and a response status R of authentication of the prover packet. The outcome of each of the challenge status C and the response status R is either "true" when the received response is correct or "false" otherwise.

At 606, from the round-trip phase measurements and round-trip time measurements of the measurement procedure 204-210 for the plurality of frequencies, measurements for frequencies where at least one of the prover carrier signal, signified by the response status R, and the verifier carrier signal, signified by the challenge status C, was not authenticated based on the respective frame delimiter are excluded from further calculation. Thus, frequencies that have the wrong response from the prover node are excluded, since the signals on those frequencies may be either have been sent by an illegitimate node or have been corrupted by deep fading. Alternatively, or additionally, measurements for frequencies where at least one prover carrier signal and verifier carrier signal was not authenticated based on the respective frame delimiter or where the measured round-trip time RTT exceeds a pre-determined value $T_t$ may be excluded from further calculation.

At 608 it is checked whether the number N' of remaining frequencies after the excluding at 606 exceeds a pre-determined threshold number T. T can have a predefined value depending on the level of security. For instance, T can be less than the total number of frequencies by one or the maximum between a minimum number of frequencies to evaluate range with adequate accuracy and a minimum number of carriers to achieve adequate security.

If not so, the calculating is failed at 610. Thus, the algorithm continues only if the number N' of remaining frequencies is larger than the pre-defined threshold T, otherwise the algorithm fails to evaluate the distance and stops.

If so, at 612, an average round-trip time, RTT, is calculated based on the round-trip time measurements for frequencies remaining after the excluding at 606.

At 614, it is checked whether the average round-trip time calculated at 612 exceeds, or alternatively exceeds or is equal to, a pre-determined value $T_t$.

If so, the calculation is failed at 620. Thus, the algorithm continues to evaluate the distance d 108 only if the average round-trip time is less than the predefined threshold $T_t$; otherwise the algorithm stops and the distance will not be evaluated. For instance, $T_t$ can be equal to the phase ambiguity bound, or smaller than the phase ambiguity bound, which, in some examples may be in noisy and multi-path environments, or where higher security is desired.

If not so, at 618, the distance d 108 is calculated from the two-way phase measurements at each remaining frequency $f_i$ remaining after the excluding at 606 using MCPDR methods.

Finally, at 622, the algorithm 600 ends.

Figure 7:
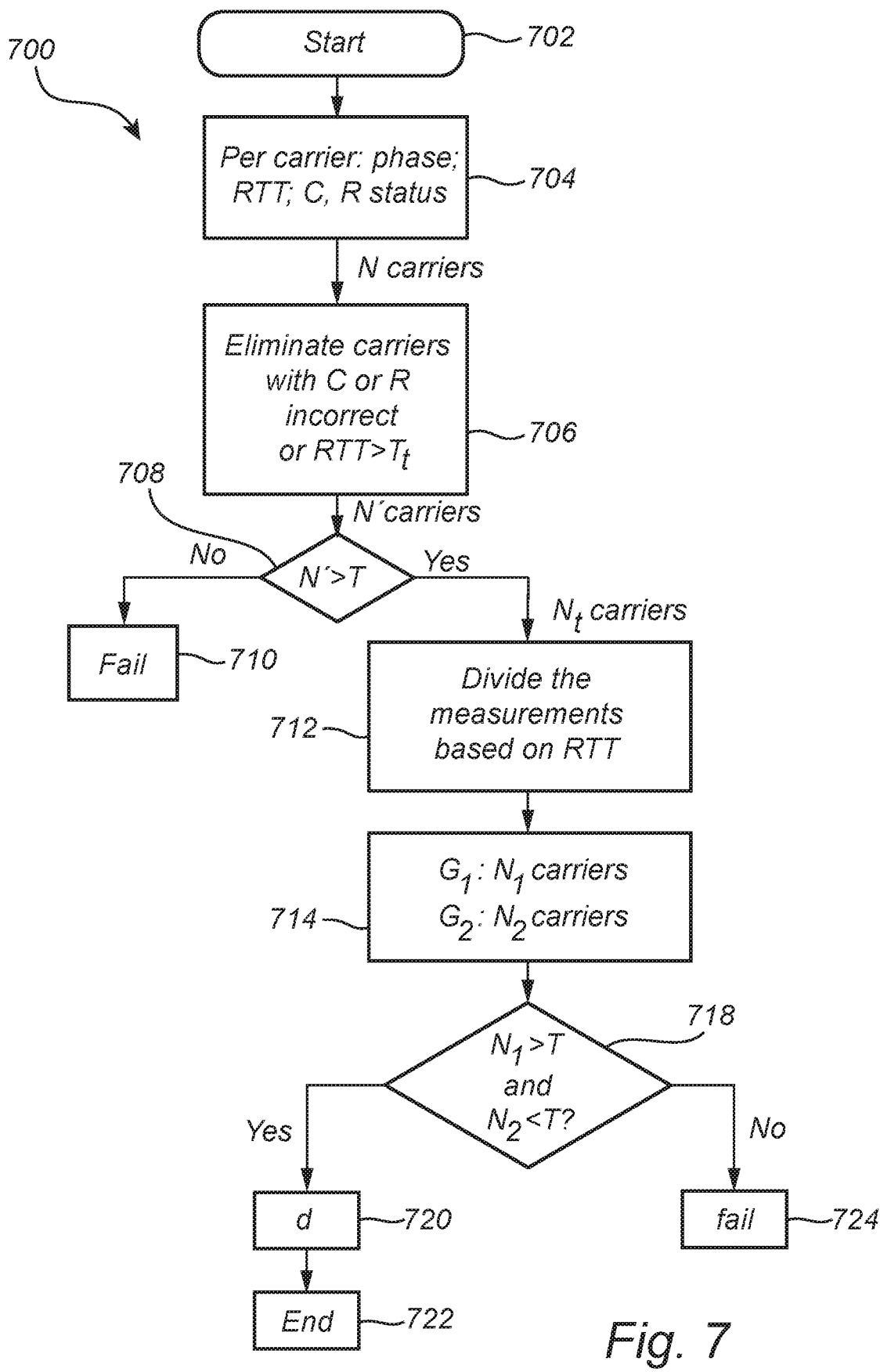
FIG. 7 shows a flow chart of a second algorithm for distance determination, according to an example embodiment.

FIG. 7 shows a flow chart of a second algorithm 700 for distance determination, as an alternative to the first algorithm 600 described above.

At 702, the algorithm 700 starts.

At 704, the algorithm 700 receives as input two-way phase measurements per frequency $f_i$, round-trip-time measurements RTT per frequency, and the results of the authentication per frequency. The results of the authentication comprise a challenge status C of the authentication of the verifier packet and a response status R of authentication of the prover packet. The outcome of each of the challenge status C and the response status R is either "true" when the received response is correct or "false" otherwise.

At 706, from the two-way phase measurements and round-trip time measurements of the measurement procedure for the plurality of frequencies, measurements for frequencies where at least one prover carrier signal, signified by the response status R, and verifier carrier signal, signified by the challenge status C, was not authenticated based on the respective the frame delimiter or where the measured round-trip time RTT exceeds a pre-determined value $T_t$ are excluded from further calculation. Thus, frequencies that have wrong challenge or response status are eliminated, since signal on those frequencies can be assumed to mostly have been sent by an illegitimate adversary node. Further, frequencies for which the calculated round-trip time value higher than the predefined threshold $T_t$ are eliminated, since in this case either the prover is outside a bound or there is an adversary who is relaying and delaying the signals. $T_t$ can for instance be equal to the phase ambiguity bound, or less than the phase ambiguity bound.

At 708, it is checked whether the number N' of remaining frequencies after the excluding at 706 exceeds a pre-determined threshold number T.

If not so, the calculating is failed at 710. Thus, the algorithm continues only if the number N' of remaining frequencies is larger than the pre-defined threshold T; otherwise the algorithm fails to evaluate the distance d 108 and stops. T can be pre-defined depending on the required level of security. For instance, T can be less than the total number of frequencies by one or the maximum between the minimum required number of frequencies to evaluate range with accuracy and the minimum required number of frequencies to achieve adequate security.

If so, at 712, the remaining frequencies are grouped based on their respective measured round-trip-times RTT, resulting, at 714, in assignment into either a prover group $G_1$, of $N_1$ frequencies, or an adversary group $G_2$, of $N_2$ frequencies. For instance, this may be done based on a cut-off value, so that frequencies with an RTT less than or equal to the cut-off value are assigned to the prover group $G_1$ and frequencies with an RTT more the cut-off value are assigned to the adversary group $G_2$. Alternatively, the group $G_1$ or $G_2$ that has the highest number $N_1$ or $N_2$ of frequencies may be designated as the prover group, and the other group $G_1$ or $G_2$ as the adversary group.

The cut-off value may either be pre-determined, for example corresponding to the phase ambiguity bound, or corresponding to a value smaller than the phase ambiguity bound, such as half the phase ambiguity bound. Alternatively, the cut-off value may be based on a statistical property of the RTT measurements, such as the mean or median value of all RTT measurements or the mean of the [10-90] percentile or the [25-75] percentile.

Thus, the frequencies are divided into two different groups ($G_1$ and $G_2$) based on their RTT value. $G_1$ denotes the group of carrier frequencies that belong to the prover and $G_2$ the group of carrier frequencies that belong to the adversary; $G_1$ contains the frequencies where the carrier signals that have not been delayed by the adversary and $G_2$ contains the frequencies where the adversary was successfully able to predict the challenge and response bits. Either of the groups $G_1$ and $G_2$ can contain zero frequencies.

At 718, it is checked whether the number $N_1$ of frequencies in the prover group exceeds the threshold number T and whether the number of frequencies $N_2$ in the adversary group does exceed the threshold number T.

If so, with both conditions at 718 fulfilled, at 720, the distance d 108 is calculated from the two-way phase measurements at each frequency $f_i$ in the prover group $G_1$ using MCPDR methods known per se.

If not so, with at least of the of the conditions at 718 not fulfilled, at 724, the algorithm fails at 724 without calculating the distance d 108.

Thus, for each group $G_1$ and $G_2$, the algorithm checks whether the number of frequencies are larger than T The algorithm evaluates the distance only if $N_1 > T$ and $N_2 < T$; otherwise the algorithm stops.

Finally, at 722, the algorithm 700 ends.

Aspects of the present disclosure are described with reference to a limited number of examples. However, as is readily appreciated by a person skilled in the art, other examples than the ones disclosed above are equally possible within the scope of the disclosure, as defined by the appended claims.

While some embodiments have been illustrated and described in detail in the appended drawings and the foregoing description, such illustration and description are to be considered illustrative and not restrictive. Other variations to the disclosed embodiments can be understood and effected in practicing the claims, from a study of the drawings, the disclosure, and the appended claims. The mere fact that certain measures or features are recited in mutually different dependent claims does not indicate that a combination of these measures or features cannot be used. Any reference signs in the claims should not be construed as limiting the scope.

What is claimed is:

1. A method of secure wireless ranging between a verifier node and a prover node, comprising:

for each frequency in a plurality of frequencies, performing a measurement procedure resulting in a two-way phase measurement and a round-trip time measurement between the verifier node and the prover node, the measurement procedure comprising:

transmitting, by the verifier node on the frequency, a verifier packet comprising a verifier carrier signal and a verifier frame delimiter;

receiving, by the prover node, the verifier packet;

performing, by the prover node, a phase measurement of the verifier carrier signal;

performing, by the prover node, a time-of-arrival measurement of the verifier frame delimiter, wherein performing the time-of-arrival measurement comprises measuring a time instant at which the verifier frame delimiter has been received;

transmitting, by the prover node on the frequency, a prover packet comprising a prover carrier signal and a prover frame delimiter;

receiving, by the verifier node, the prover packet;

performing, by the verifier node, a phase measurement of the prover carrier signal; and performing, by the verifier node, a time-of-arrival measurement of the prover frame delimiter, wherein performing the time-of-arrival measurement comprises measuring a time instant at which the prover frame delimiter has been received, wherein each of the verifier frame delimiters and each of the prover frame delimiters comprise a respective authentication code, and wherein the authentication codes are based on a key commonly known by the verifier node and the prover node;

attempting to calculate a distance between the verifier node and the prover node based on the two-way phase measurements and the round-trip time measurements for the plurality of frequencies, wherein the carrier signals are authenticated based on the authentication code of the corresponding frame delimiter and the commonly known key, and wherein attempting to calculate the distance comprises:

from the two-way phase measurements and round-trip time measurements of the measurement procedure for the plurality of frequencies, excluding from further calculation measurements for frequencies where:

at least one of the prover carrier signal and the verifier carrier signal was not authenticated based on the respective frame delimiter; or the measured round-trip time exceeds a pre-determined value; and failing the attempt to calculate the distance if the number of remaining frequencies after the excluding does not exceed a pre-determined threshold number; and otherwise, calculating the distance based on the phase measurement results remaining after the excluding.

2. The method of claim 1, wherein the verifier carrier signal is preceded by the frame delimiter and the prover carrier signal is followed by the frame delimiter.

3. The method of claim 1, wherein the authentication code is a sequence of bits selected using a pseudo-random function from a pre-determined set of sequences.

4. The method of claim 3, wherein the pseudo-random function has as input the commonly known key and one or more of the following: an index of the carrier signal, a sequence index, an identifier of the node transmitting the corresponding frame delimiter, and an identifier of the node receiving the corresponding frame delimiter.

5. The method of claim 3, wherein each sequence of the pre-determined set of sequences is a Gold code sequence.

6. The method of claim 1, wherein the measurement procedure further comprises:
transmitting, by the prover node, the time-of-arrival measurement of the verifier frame delimiter or the phase measurement of the verifier carrier signal to the verifier node.

7. The method of claim 1, wherein, during the verifier node transmitting the verifier carrier signal, the prover node adjusts its local oscillator (LO) based on the phase measurement of the verifier carrier signal.

8. The method of claim 1, wherein attempting to calculate the distance further comprises:
evaluating an average round-trip time based on the round-trip time measurements for frequencies remaining after the excluding; and
failing the attempt to calculate if the average round-trip time exceeds a predetermined value.

9. The method of claim 1, wherein attempting to calculate the distance further comprises:
assigning the remaining frequencies into a prover group and an adversary group based on their respective measured round-trip times; and
failing the attempt to calculate if the number of frequencies in the prover group does not exceed the threshold number or if the number of frequencies in the adversary group does exceed the threshold number.

10. The method of claim 1, wherein the prover node transmits the frame delimiter comprising:
a first authentication code when the verifier carrier signal has been authenticated based on the corresponding authentication code of the corresponding verifier node frame delimiter; and
a second, different authentication code otherwise.

11. A method of secure wireless ranging between a verifier node and a prover node, comprising:
for each frequency in a plurality of frequencies, performing a measurement procedure comprising:
receiving, by the prover node, a verifier packet comprising a verifier carrier signal and a verifier frame delimiter from the verifier node;
performing, by the prover node, a phase measurement of the verifier carrier signal;
performing, by the prover node, a time-of-arrival measurement of the verifier frame delimiter, wherein performing the time-of-arrival measurement comprises measuring a time instant at which the verifier frame delimiter has been received; and
transmitting, by the prover node on the frequency, a prover packet comprising a prover carrier signal and a prover frame delimiter, wherein each of the verifier frame delimiters and each of the prover frame delimiters comprise a respective authentication code, and wherein the authentication codes are based on a key commonly known by the verifier node and the prover node;
attempting to calculate a distance between the verifier node and the prover node based on the measurement procedure, wherein the verifier carrier signals are authenticated by the prover node based on the authentication code of the corresponding frame delimiter and the commonly known key, and wherein attempting to calculate the distance comprises:
from the measurement procedure for the plurality of frequencies, excluding from further calculation measurements for frequencies where the verifier carrier signal was not authenticated based on the corresponding frame delimiter; and
failing the attempt to calculate the distance if the number of remaining frequencies after the excluding does not exceed a pre-determined threshold number; and
otherwise, calculating the distance based on the phase measurement results remaining after the excluding.

12. A prover node that participates in secure wireless ranging with a verifier node,
wherein the prover node comprises a first processor and a first transceiver,
wherein the verifier node comprises a second processor and a second transceiver,
wherein the prover node, for each frequency in a plurality of frequencies, participates in a measurement procedure comprising:
receiving, by the prover node, a verifier packet comprising a verifier carrier signal and a verifier frame delimiter from the verifier node;
performing, by the prover node, a phase measurement of the verifier carrier signal;
performing, by the prover node, a time-of-arrival measurement of the verifier frame delimiter, wherein performing the time-of-arrival measurement comprises measuring a time instant at which the verifier frame delimiter has been received; and
transmitting, by the prover node on the frequency, a prover packet comprising a prover carrier signal and a prover frame delimiter, wherein each of the verifier frame delimiters and each of the prover frame delimiters comprise a respective authentication code, and wherein the authentication codes are based on a key commonly known by the verifier node and the prover node,
wherein the prover node participates in an attempted distance calculation between the verifier node and the prover node based on the measurement procedure, wherein the verifier carrier signals are authenticated by the prover node based on the authentication code of the corresponding frame delimiter and the commonly known key, and wherein the attempted distance calculation comprises:
from the measurement procedure for the plurality of frequencies, excluding from further calculation measurements for frequencies where the verifier carrier signal was not authenticated based on the corresponding frame delimiter; and
failing the attempted distance calculation if the number of remaining frequencies after the excluding does not exceed a pre-determined threshold number, and
wherein, otherwise, the prover node participates in a distance calculation based on the phase measurement results remaining after the excluding.

13. A method of secure wireless ranging between a verifier node and a prover node, comprising:
for each frequency in a plurality of frequencies, performing a measurement procedure comprising:
transmitting, by the verifier node on the frequency, a verifier packet comprising a verifier carrier signal and a verifier frame delimiter;
receiving, by the verifier node, a prover packet comprising a prover carrier signal and a prover frame delimiter from the prover node;

performing, by the verifier node, a phase measurement of the prover carrier signal; and performing, by the verifier node, a time-of-arrival measurement of the prover frame delimiter, wherein performing the time-of-arrival measurement comprises measuring a time instant at which the prover frame delimiter has been received, wherein each of the verifier frame delimiters and each of the prover frame delimiters comprise a respective authentication code, and wherein the authentication code is based on a key commonly known by the verifier node and the prover node;

attempting to calculate a distance between the verifier node and the prover node based on the measurement procedure, wherein the prover carrier signals are authenticated by the verifier node based on the authentication code of the corresponding frame delimiter and the commonly known key, and wherein attempting to calculate the distance comprises:

from the measurement procedure for the plurality of frequencies, excluding from further calculation measurements for frequencies where the prover carrier signal was not authenticated based on the corresponding frame delimiter; and failing the attempt to calculate the distance if the number of remaining frequencies after the excluding does not exceed a pre-determined threshold number; and otherwise, calculating the distance based on the phase measurement results remaining after the excluding.

14. A verifier node that participates in secure wireless ranging with a prover node, wherein the prover node comprises a first processor and a first transceiver, wherein the verifier node comprises a second processor and a second transceiver, wherein the verifier node, for each frequency in a plurality of frequencies, participates in a measurement procedure comprising:

transmitting, by the verifier node on the frequency, a verifier packet comprising a verifier carrier signal and verifier frame delimiter;

receiving, by the verifier node, a prover packet comprising a prover carrier signal and a prover frame delimiter from the prover node;

performing, by the verifier node, a phase measurement of the prover carrier signal; and performing, by the verifier node, a time-of-arrival measurement of the prover frame delimiter, wherein performing the time-of-arrival measurement comprises measuring a time instant at which the prover frame delimiter has been received, wherein each of the verifier frame delimiters and each of the prover frame delimiters comprise a respective authentication code, and wherein the authentication code is based on a key commonly known by the verifier node and the prover node, wherein the verifier node participates in an attempted distance calculation between the verifier node and the prover node based on the measurement procedure, wherein the prover carrier signals are authenticated by the verifier node based on the authentication code of the corresponding frame delimiter and the commonly known key, and wherein the attempted distance calculation comprises:

from the measurement procedure for the plurality of frequencies, excluding from further calculation measurements for frequencies where the prover carrier signal was not authenticated based on the corresponding frame delimiter; and failing the attempted distance calculation if the number of remaining frequencies after the excluding does not exceed a pre-determined threshold number, and wherein, otherwise, the verifier node participates in a distance calculation based on the phase measurement results remaining after the excluding.

15. A system, comprising:

a prover node that participates in secure wireless ranging with a verifier node, wherein the prover node comprises a first processor and a first transceiver, wherein the verifier node comprises a second processor and a second transceiver, wherein the prover node, for each frequency in a plurality of frequencies, participates in a measurement procedure comprising:

receiving a verifier packet comprising a verifier carrier signal and a verifier frame delimiter from the verifier node;

performing a phase measurement of the verifier carrier signal;

performing a time-of-arrival measurement of the verifier frame delimiter, wherein performing the time-of-arrival measurement comprises measuring a time instant at which the verifier frame delimiter has been received; and transmitting, on the frequency, a prover packet comprising a prover carrier signal and a prover frame delimiter, wherein each of the verifier frame delimiters and each of the prover frame delimiters comprise a respective authentication code, wherein the authentication codes are based on a key commonly known by the verifier node and the prover node, wherein the verifier carrier signals are authenticated by the prover node based on the authentication code of the corresponding frame delimiter and the commonly known key, wherein the verifier node participates in secure wireless ranging with the prover node, wherein the verifier node, for each frequency in a plurality of frequencies, participates in the measurement procedure, and wherein the measurement procedure further comprises:

transmitting, on the frequency, the verifier packet comprising the verifier carrier signal and the verifier frame delimiter;

receiving the prover packet comprising the prover carrier signal and the prover frame delimiter from the prover node;

performing a phase measurement of the prover carrier signal; and performing a time-of-arrival measurement of the prover frame delimiter, wherein performing the time-of-arrival measurement comprises measuring a time instant at which the prover frame delimiter has been received, wherein each of the verifier frame delimiters and each of the prover frame delimiters comprise the respective authentication code, wherein the authentication code is based on a key commonly known by the verifier node and the prover node, and wherein the prover carrier signals are authenticated by the verifier node based on the authentication code of the corresponding frame delimiter and the commonly known key, wherein the prover node and the verifier node participate in an attempted distance calculation between the verifier node and the prover node based on the measurement procedure, and wherein the attempted distance calculation comprises:

from the phase measurement of the verifier carrier signal, the phase measurement of the prover carrier signal, and round-trip time measurements of the measurement procedure for the plurality of frequencies, excluding from further calculation measurements for frequencies where at least one of the prover carrier signal and the verifier carrier signal was not authenticated based on the respective frame delimiter; and failing the attempted distance calculation if the number of remaining frequencies after the excluding does not exceed a pre-determined threshold number, and wherein, otherwise, the prover node and the verifier node participate in a distance calculation based on the phase measurement results remaining after the excluding.

\* \* \* \* \*